(12) United States Patent
Muthegere et al.

(10) Patent No.: US 11,481,817 B2
(45) Date of Patent: Oct. 25, 2022

(54) SYSTEMS AND METHODS FOR MULTI-PLATFORM INTEGRATION

(71) Applicant: Zeta Global Corp., New York, NY (US)

(72) Inventors: Jaisimha Muthegere, Bangalore (IN); Ashley Herzog Kirchgessner, Brooklyn, NY (US); Raji Gopalakrishnan, Bangalore (IN); David Pearsall, New York, NY (US); Bradley McCall, New York, NY (US)

(73) Assignee: Zeta Global Corp., New York, NY (US)

( * ) Notice: Subject to any disclaimer, the term of this patent is extended or adjusted under 35 U.S.C. 154(b) by 0 days.

(21) Appl. No.: 16/040,690

(22) Filed: Jul. 20, 2018

(65) Prior Publication Data

US 2019/0026789 A1 Jan. 24, 2019

Related U.S. Application Data

(60) Provisional application No. 62/535,296, filed on Jul. 21, 2017.

(51) Int. Cl.
*G06Q 30/00* (2012.01)
*G06Q 30/02* (2012.01)
*G06F 3/0481* (2022.01)

(52) U.S. Cl.
CPC ....... *G06Q 30/0277* (2013.01); *G06F 3/0481* (2013.01)

(58) Field of Classification Search
None
See application file for complete search history.

(56) References Cited

U.S. PATENT DOCUMENTS

| | | |
|---|---|---|
| 2006/0074748 A1 | 4/2006 | Kline et al. |
| 2010/0049613 A1 | 2/2010 | Angles et al. |
| 2011/0112899 A1 | 5/2011 | Benjamin et al. |

(Continued)

FOREIGN PATENT DOCUMENTS

WO WO-2016100777 A1 6/2016

OTHER PUBLICATIONS

"International Application Serial No. PCT/US2018/043005, International Search Report dated Sep. 26, 2018", 2 pgs.

(Continued)

*Primary Examiner* — Meredith A Long
(74) *Attorney, Agent, or Firm* — Schwegman Lundberg & Woessner, P.A.

(57) ABSTRACT

Described herein are embodiments of a multi-platform integration system. A multi-platform integration system includes a computing system. The computing system hosts an application. The computing system configured to receive a first request from a user device to execute an instance of the application and transmit a graphical user interface (GUI) to the user device to be rendered on a display of the user device, receive a second request, via the GUI, from the user device to deploy a digital advertisement. The computing system is further configured to interface with each one of the platforms in the set of platforms and integrate the digital advertisement directly with each one of selected platforms.

20 Claims, 8 Drawing Sheets

(56) References Cited

U.S. PATENT DOCUMENTS

2011/0246297 A1* 10/2011 Buchalter ............. G06Q 30/08
                                              705/14.53
2016/0117738 A1   4/2016 Shen et al.
2016/0125454 A1*  5/2016 Karloff ............. G06Q 30/0249
                                              705/14.48

OTHER PUBLICATIONS

"International Application Serial No. PCT/US2018/043005, Written Opinion dated Sep. 26, 2018", 6 pgs.
"European Application Serial No. 18834880.9, Communication Pursuant to Article 94(3) EPC dated Apr. 29, 2020", 7 pgs.
"European Application Serial No. 18834880.9, Extended European Search Report dated Mar. 20, 2020", 4 pgs.
"European Application Serial No. 18834880.9, Response filed Sep. 1, 2020 to Communication Pursuant to Article 94(3) EPC dated Apr. 29, 2020", 23 pgs.

* cited by examiner

SYSTEMS AND METHODS FOR MULTI-PLATFORM INTEGRATION

CROSS-REFERENCE TO RELATED PATENT APPLICATIONS

This application claims priority to U.S. Provisional Application No. 62/535,296 filed on Jul. 21, 2017, the content of which is hereby incorporated by reference in its entirety.

BACKGROUND

When executing a digital media campaign, users often times access multiple media buying platform to make their buys. As the digital media campaigns run, users have to log back into each of the disparate platforms which can be quite time-consuming and error-prone given that they are repeating these steps manually multiple times across multiple platforms.

SUMMARY

A multi-platform integration system can be used to create a single digital advertisement whose budget can be allocated and distributed as desired across multiple different media buying platforms. The digital advertisement can be seamlessly integrated with the multiple different media buying platforms. A Visto® application provides users with the ability to access multiple media buying platforms (including DSPs, SSPs, exchanges, APis and publishers directly) through a single user interface (UI). The multi-platform integration system provides users with the freedom and flexibility of setting up the digital advertisement, overlay the targeting parameters as desired (screen, format, audience, geography, site list, etc. . . . ), and selecting multiple media buying platforms to push the digital advertisement directly from the Visto UI The user has the ability to allocate budget across multiple platforms, all managed via the one the digital advertisement. The multi-platform integration system automates and streamlines the advertising trafficking process, resulting in less time trafficking advertising campaigns, fewer human errors and easy advertising budget and performance management. In addition, the Visto UI renders the performance and allows the user to spend across all the platforms in a single UI The multi-platform integration system can use API integrations with multiple media buying platforms to facilitate the automated buying of media across platforms and an effective user interface design to make digital advertisement setup and budget allocation across media buying platforms efficient. The multi-platform integration system can provide the following advantages over conventional systems:

Operational Efficiency: Rather than requiring the user to enter in the digital advertisement and targeting parameters each time they create a new digital advertisement for a different media buying platform, the multi-platform integration system allows the user to create one ad with all respective targeting parameters with user-controlled budget allocation to deploy to different buying platforms. Additionally, multi-platform integration system eliminates duplication. The multi-platform integration system eliminates the need to manage separate ad budgets across different media buying platforms.

Performance Improvement: The multi-platform integration system can provide the digital advertisement pacing and performance across platforms in UI. In this regard, users are able to quickly identify strengths and weaknesses and take actionable next steps to dynamically reallocate budget among chosen platforms and/or add in new platforms for testing and evaluation.

Reduction of Human Error: The multi-platform integration system eliminates the manual digital advertisement setup within disparate media buying platforms. The multi-platform integration system reduces the likelihood of human error since the user has to set up a digital advertisement once, and then choose desired budget allocation for each of the media buying platforms.

In one embodiment, a multi-platform integration system includes a computing system in communication with platforms, a database, and one or more user devices in a networked environment. The computing system hosts an application. The computing system configured to receive a first request from a user device to execute an instance of the application, transmit a graphical user interface (GUI) to the user device to be rendered on a display of the user device, receive a second request, via the GUI, from the user device to deploy a digital advertisement. The second request includes a set of platforms, a set of settings, a set of parameters, and a set of allocation data. The computing system is further configured to interface with each one of the platforms in the set of platforms and integrate the digital advertisement directly with each one of the platforms in the set of platforms based on the set of settings, the set of parameters and the set of allocation data received in the request.

The digital advertisement is one or more of an image, video, text, or audio. The allocation data is associated with a number of units of the digital advertisement to be deployed to each platform in the set of platforms. The computing system is further configured to receive a third request from the user device to adjust the set of allocation data for one or more platforms of the set of platforms on which the digital advertisement has been integrated, after the digital advertisement is integrated with each one of the platforms of the set of platforms, dynamically adjust the allocation data for each of the one of the platforms, and interface with each one of the one or more platforms to adjust the number of units of the digital advertisement to be deployed for the respective platform, based on the adjustment of the allocation data. The computing system is further configured to receive performance data associated with the digital advertisement and render the performance data on the GUI.

The set of platforms includes one or more of: a demand side platform (DSP), a supply side platform (SSP), an exchange, a publisher, and an Application Program Interface (API) program. A publisher is associated with a web-site. In response to integrating the digital advertisement with a publisher, the computing system is configured to embed the digital advertisement on the web-site at a specified location.

The set of settings include one or more of: flight dates, ad format, screen types, and Key Performance Indicators. The parameters include one or more of: audience, geography, daypart, sellers, video, and white/blacklists.

BRIEF DESCRIPTION OF DRAWINGS

The accompanying figures, which are incorporated in and constitute a part of this specification, illustrate one or more embodiments of the present disclosure and, together with the description, help to explain embodiments of the present disclosure. The embodiments are illustrated by way of example and should not be construed to limit the present disclosure. In the figures.

DETAILED DESCRIPTION

Described herein are embodiments of a multi-platform integration system. A multi-platform integration system includes a computing system in communication with platforms, a database, and one or more user devices in a networked environment. The computing system hosts an application. The computing system configured to receive a first request from a user device to execute an instance of the application, transmit a graphical user interface (GUI) to the user device to be rendered on a display of the user device, and receive a second request, via the GUI, from the user device to deploy a digital advertisement. The second request includes a set of platforms, a set of settings, a set of parameters, and a set of allocation data. The computing system is further configured to interface with each one of the platforms in the set of platforms and integrate the digital advertisement directly with each one of the platforms in the set of platforms based on the set of settings, the set of parameters and the set of allocation data. The multi-platform integration system automates and streamlines the advertising trafficking process, resulting in less time trafficking advertising campaigns, fewer human errors and easy advertising budget and performance management. In addition, the Visto® UI (i.e., the GUI) renders the performance and allows users to spend across all the platforms in a single UL. The multi-integration system provides operational efficiency, performance enhancement, and an enhanced system to maintain data integrity by reducing human error.

Figure 1:
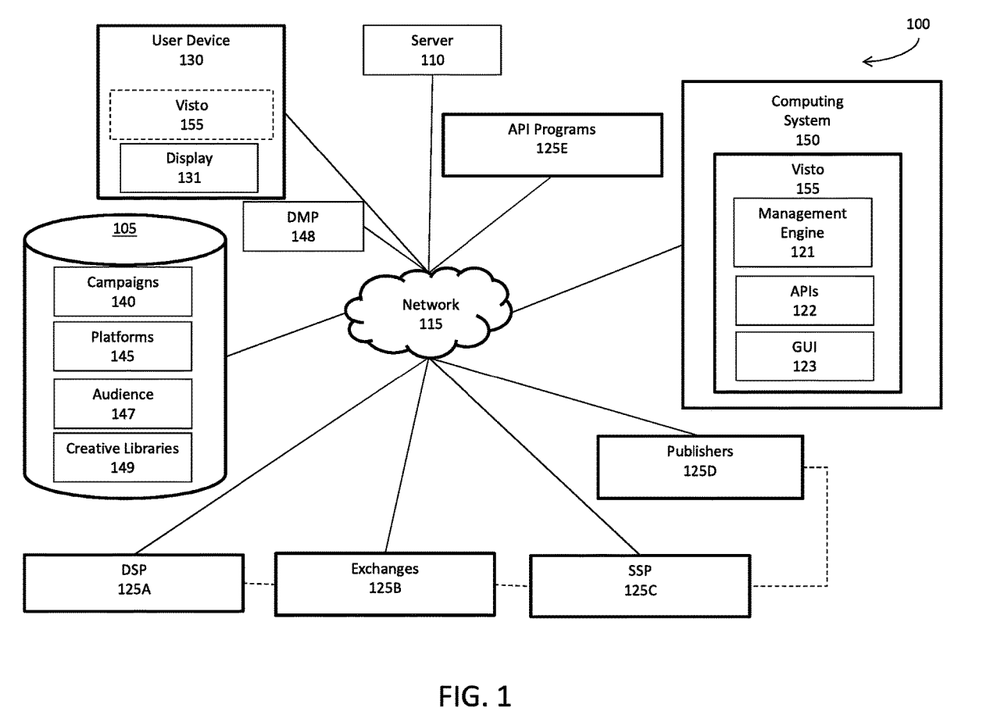
FIG. 1 is a block diagram illustrating a multi-platform integration system in accordance with an exemplary embodiment.

FIG. 1 is a block diagram illustrating a multi-platform integration system in accordance with an exemplary embodiment. The multi-platform integration system 100 can include one or more computing systems 150, one or more databases 105, one or more servers 110, one or more user computing devices 130, one or more Demand Side Platforms (DSP) 125A, one or more exchanges 125B, one or more Supply Side Platforms (SSP) 125C, one or more publishers 125D, one or more Application Program Interface (API) programs 125e, and a Data Management Platform (DMP) 148. In one exemplary embodiment, the computing system 150 can be in communication with the database(s) 105, user devices 130, the DSPs 125A, the exchanges 125B, the SSPs 125C, the publishers 125D, the API programs 125e, a Data Management Platform (DMP) 148, and the creative libraries database 149, via a communications network 115. The computing system 150 can execute a Visto® application 155. The Visto® application 155 can include the management engine 121 and one or more Application Program Interfaces (APIs) 122. In one example, the management engine 121 can be embodied as a Multi-Platform Ad Management Tool (e.g., a Universal Remote). The computing system 150 can also implement an embodiment of the graphical user interface 123. The management engine 121 can implement the multi-platform integration system 100 using the one or more APIs 122. The Visto® application 155 can reside on one of the computing system 150 and can be accessible to the user device 130. For example, the user device 130 can execute a web browser or other application and can navigate to a universal resource locator (URL) associated with the Visto® application 155 on the computing system 150, and the user device 130 can interact with Visto® application 155 via the web browser. Alternatively, at least a portion of the Visto® application 155 can reside on the user device 130 or one of the servers 110.

In an example embodiment, one or more portions of the communications network 115, can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 150 may include one or more computers or processors configured to communicate with the database(s) 105, user devices 130, the DSPs 125A, the exchanges 125B, the SSPs 125C, the publishers 125D, the API programs 125e, and the DMP 148, via the network 115. The computing system 150 may host one or more applications, such as the Visto application 155, configured to interact with one or more components of the user devices 130, the DSPs 125A, the exchanges 125B, the SSPs 125C, the publishers 125D, the API programs 125e, the DMP 148, and/or facilitates access to the content of the databases 105. The databases 105 may store information/data, as described herein. For example, the databases 105 can include a campaigns database 140, platforms database 145, audience database 147, and a creative libraries database 149. The campaigns database 140 can store information associated with campaigns associated with digital data such as digital advertisements. The platforms database 145 can store information associated with platforms such as media buying platforms. The audience database 147 can include information associate with audience groups for digital advertisement targeting. The creative libraries database 149 can include information associated with creative assets for digital advertisements. The databases 105 can be located at one or more geographically distributed locations from each other or from the computing system 150. Alternatively, the databases 105 can be included within in the computing system 150.

In an exemplary embodiment, a user device 130 can execute the Visto® application 155 (e.g., as it resides on the user device 130 or via a web browser) to interface with the computing system 150. In response to executing the Visto® application 155, the computing system 150 can render the GUI 123 on the user device 130. The computing system 150 can receive input from user device 130, via GUI 123.

A user device 130 can transmit a request to integrate digital data along multiple different platforms, via the Visto® application 155, to the computing system 150. In response to receiving the request the computing system 150 can execute the management engine 121. As an example, the digital data can be a digital advertisement. The digital advertisement can be one or more of an image, video, gif, rich text, audio, or other type of digital data. The user can be an entity such as a company, advertiser, educational institution, marketing agency, or governmental institution. The user device 130 can receive a selection of platforms on which the user wishes to distribute the digital advertisement, via the GUI 123 of the Visto® application 155. The platforms can be media buying platforms such as a DSP platform 125A, SSP platform 125B, exchange 125C, publisher 125D, and API programs 125e. The management engine 121 can receive the selection of platforms, in response to the user device 130 receiving the selection of platforms, via the GUI 123 of the Visto® application 155.

The user device 130 can receive input associated with creating a campaign shell with designated lines, via the GUI 123 of the Visto® application 155. The lines can include placements associated with the campaign. The placements can include attributes such as screens, formats, and targeting. The user device 130 can receive input associated with assigning parameters for the digital advertisement in the Visto® application 155. The parameters can include ad format, screen types, Key Performance Indicators (KPI), etc. The parameters can define the way the advertisement will be delivered. The management engine 121 can receive the input associated with creating a campaign shell with designated lines and the assignment of parameters for the digital advertisement, in response to the user device 130 receiving the input, via the GUI 123 of the Visto® application 155.

The user device 130 can also receive input associated with budget and allocation information, via the GUI 123 of the Visto® application 155. The user device 130 can also receive input associated with a rate and rate type (i.e., type of currency), via the GUI 123 of the Visto® application 155. The rate can be billable cost charged to an advertiser. The user device 130 can also receive input associated with a selection between delivering the digital advertisement based on units or the budget, via the GUI 123 of the Visto® application 155. The management engine 121 can receive the selection of delivering the digital advertisement based on units or budget. In response to inputting a number of units of the digital advertisement a user desires to deliver, the management engine 121 can automatically calculate and render an Ad Budget value, on the GUI 123 of the Visto® application 155. Alternatively, or in addition to, in response to a user inputting an Ad Budget value, the management engine 121 can calculate and/or adjust the number of units of digital advertising to be delivered. The management engine 121 can render the number of units on the GUI 123 of the Visto® application 155.

The user device 130 can also receive input associated with targeting parameters, via the GUI 123 of the Visto® application 155, in order or refine where, when, and to whom the user would like the digital advertisement to be delivered. The user device 130 can also receive input associated with the following targeting parameters: audience, geography, daypart, sellers, and video, white/black lists.

The audience parameters can be information associated with targeting a focused audience using demographic, behavioral, purchase, search, interest, and other data categories. Audiences are selected from the available data sources such as the audience database 147. For example, the management engine 121 can retrieve the audiences from the audience database 147. The audience database 147 can retrieve audience information from a Data Management Platform (DMP) 148. The DMP 148 can be a centralized data management platform that allows you to create target audiences based on a combination of first-party and third-party audience data. The audience information can also be retrieved from a selected platform's proprietary segment list.

The geography parameter can include information associated with targeting advertisements based on geographic location. The targeting information can include or exclude geographic regions such as countries, states, metros/Designed Market Areas (DMAs), cities, and zip/postal codes, in which the user would or would not with to deliver digital advertisements. The daypart parameter can include information associated with delivering digital advertisements based on the days of the week or hours of the day. The user can select the specific days and times on which the user wishes to deliver the digital advertisement.

The sellers parameter can include information associated with targeting a digital advertisement including or excluding specific third party inventory sellers from open exchange buys. The user can specify the third party inventory sellers to include or exclude. The video parameter can include information associated with selecting the player size, position, and playback methods on which a digital advertisement will be running. The user can specify the player size, position, and/or playback methods. The white/blacklists parameter can include information associated with including or excluding specific domains or applications in order to control the inventory on which the digital advertisement can be displayed or run. The user can specify the domains or applications to include or exclude.

The management engine 121 can receive the input targeting parameters. It can be appreciated that the user can select one or more of the aforementioned targeting parameters. It can also be appreciated, that additional targeting parameters can be presented to the user.

The user device 130 can receive input associated with the creative assets of the digital advertisement, via the GUI 123 of the Visto® application 155. The creative assets can include promotional messaging for the user (i.e., advertiser and/or brand). The user can select from two different options to generate the creative assets, add from existing or create new.

In the event, the user device 130 receives input associated with a selection of add from existing, via the GUI 123 of the Visto® application 155, the management engine 121 can render a list of creative assets from a creative library on the GUI 123. As an example, the management engine 121 can retrieve a list of creative assets relevant to the user (i.e., advertiser and/or brand) from the creative libraries database 149. The management engine 121 can also render a chosen advertisement format. The management engine 121 can receive the selected creative assets and chose advertisement format based on input from the user device on the GUI 123 of the Visto® application 155.

In the event, the user device 130 receive input associated with a selection to create new, from the GUI 123 of the Visto® application 155, the management engine 121 can render an option to create a new creative asset on the GUI 123. The user device 130 can receive input associated with creating new creative asset, via the he GUI 123 of the Visto® application 155. Once a new creative asset is created, the management engine 121 can save the creative asset in a creative library associated with the specific user (user device 130) in the creative libraries database 149.

The management engine 121 can receive the selected creative assets previously created and/or a newly created creative asset. The management engine 121 can render a list of the selected creatives assets including the name, size, an ad server from which the creative asset is hosted (if applicable), and any Secure Sockets Layer (SSL) support on the GUI 123.

In response to completing the selections and input associated with the digital advertisement, the user device 130 can receive a selection to save and close, via the he GUI 123 of the Visto® application 155. The management engine 121 can receive the save and close selection, and save the selected and input information associated with the digital advertisement including selected platforms, parameters, targeting parameters, budget and allocation, and creative assets in the campaigns database 140. The user device 130 can receive a selection to push campaign, via the he GUI 123 of the Visto® application 155. In response to the management engine 121 receiving the selection to push campaign, the management engine 121 can deploy the digital advertisement to the selected platforms. The digital advertisement can be deployed based on the parameters, targeting parameters, budget and allocation, and creative assets. The management engine 121 can use the APIs 122 to interface and integrate the digital advertisement in each of the selected platforms. In response to deploying the digital advertisement, the management engine 121 can render delivery and performance information associated with the digital advertisement for each platform on the GUI 123. The user device 130 can receive input associated with adjustments in the budget and allocation information while the digital advertisement is deployed. In response to the user device 130, receiving a subsequent selection of push campaign, after adjusting the budget and allocation information, the management engine can dynamically reallocate the budget among each of the platforms based on the adjustments and distribute the reallocations to each of the platforms.

As described above, the platforms can be one or more of a DSP 125a, an exchange 125b, a SSP 125c, publishers 125d, and API programs 125e. A DSP 125a can enable buyers with direct real-time bidding access across multiple sources of digital advertisement inventory. The DSP 125a enables advertisers to purchase impressions (i.e., a view or an ad view), across publisher sites (i.e., publishers 125d), but targeted to specific users based on information such as their location and their previous browsing behavior. The management engine 121 can deploy the digital advertisement to a DSP 125a. The management engine 121 can purchase the impressions from publisher sites based on the parameters, targeting parameters, budget and allocation, and creative assets assigned by the user for the digital advertisement.

An exchange 125b can be an ad exchange. The exchange 125b can be used by advertisers (i.e., the user) to purchase advertisement space as well as by publishers to sell advertising space. The buying and selling can often be executed using real-time auctions. An exchange 125b can be a big pool of ad impressions. Publishers 125d can put their ad impressions into the pool. An advertiser (i.e., the user) can purchase the ad impressions. The purchases can be made in real time based on information such as the previous behavior of the user an ad is being served to, time of day, device type, ad position and more. The management engine 121 can deploy the digital advertisement directly to an exchange 125b such as an ad exchange. The management engine 121 can purchase ad impressions for the digital advertisements based on the parameters, targeting parameters, budget and allocation, and creative assets for the digital advertisement using the exchange 125b.

A SSP 125c can publishers 125d to sell their inventory to exchanges 125b and DSP 125a. The management engine 121 can deploy the digital advertisement directly to the SSP 125c. The management engine 121 can purchase a publisher's 125d inventory directly from the SSP 125c based on the parameters, targeting parameters, budget and allocation, and creative assets for the digital advertisement.

A publisher 125d can be an entity which publishes (i.e., displays or renders) the digital advertisement. The publisher 125d can be a website, domain, web application, or any other type of digital media. The publisher 125d can sell inventory such as ad impressions. Ad impressions can be views, view counts, and/or advertisement space. The management engine 121 can purchase impressions and deploy the digital advertisement directly to on specified publishers 125d. The management engine 121 can deploy the digital advertisement on the specified publishers 125d based on parameters, targeting parameters, budget and allocation, and creative assets for the digital advertisement. As a non-limiting example, the digital advertisement can be an image embedded with a hyperlink. The management engine 121 can embed the image of a specified size, with the embedded hyperlink on a publisher's website at a specified location on the website for a specified duration of time. The management engine 121 can indicate which geographic locations the digital advertisement is to be displayed.

An API program 125e can be custom tools developed enables advertisers and/or agencies (i.e., the user) to publish the digital advertisement with various publishers. As an example, various social media entities can have different API programs to publish the digital advertisements. The management engine 121 can deploy the digital advertisement directly to specified API programs 125e based on based on parameters, targeting parameters, budget and allocation, and creative assets for the digital advertisement.

In one embodiment, a digital advertisement can be deployed directly to a DSP 125a platform, to purchase ad space/impressions for the digital advertisement. The publishers 125d can interface with the SSP 125c to sell ad space/impressions. The DSP 125a and SSP 125b can interface with one another, via the exchange 125b.

FIGS. 2A-D illustrate exemplary screens on a graphical user interface (GUI) for the multi-platform integration system. As described above with respect to FIG. 1, the multi-platform integration system (e.g., multi-platform integration system 100 as shown in FIG. 1) can include a GUI (e.g., GUI 123 as shown in FIG. 1) rendered on a display (e.g., display 131 as shown in FIG. 1) of the user device (e.g., user device 130 as shown in FIG. 1) to facilitate deploying and integrating a digital advertisement on various platforms.

Figure 2A:
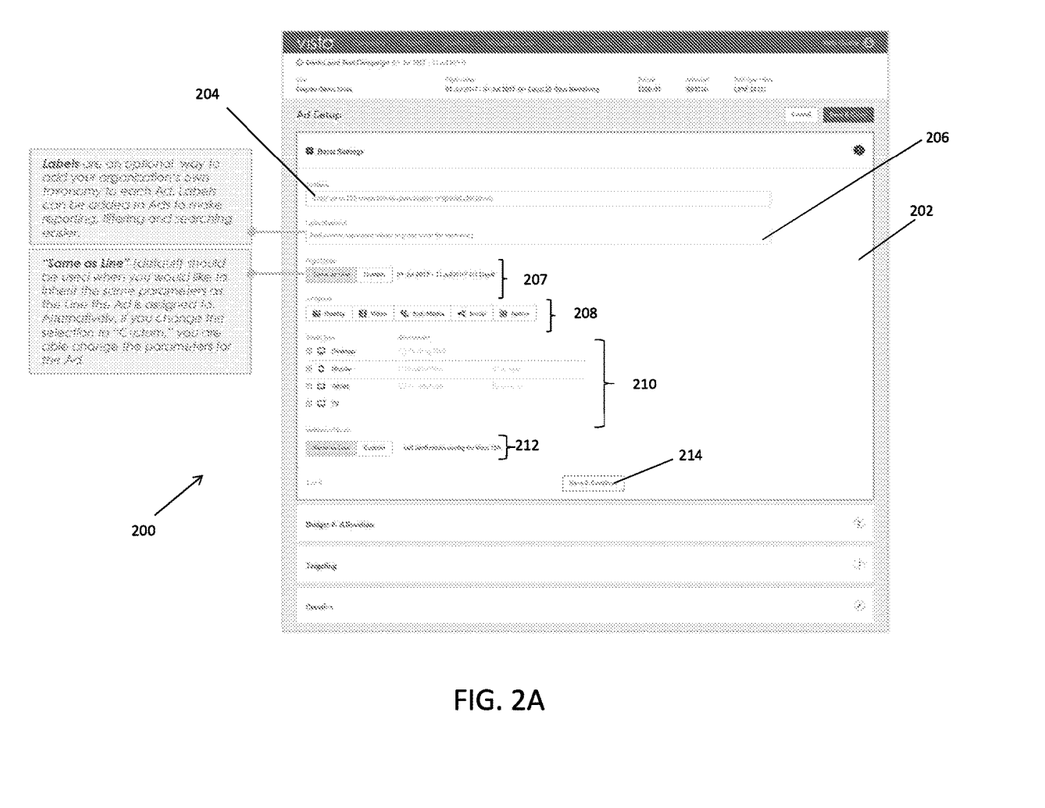
FIGS. 2A-D illustrate exemplary graphical user interfaces (GUI) for the multi-platform integration system.

With reference to FIG. 2A, to initiate deploying a digital advertisement on various platforms, a user can launch screen 200 on the Visto® application (e.g., Visto application 155 as shown in FIG. 1). In response to launching the Ad Setup screen 200, a basic display 202 can be rendered on the GUI. The basic settings display 202 can include an ad name input box 204. The ad name input box 204 can receive alphanumeric text input to name the digital advertisement being setup. The basic settings display 202 can further include a labels input box 206. The labels input box 206 can receive alphanumeric text input for adding an entity's taxonomy to the digital advertisement to facilitate reporting, filtering, and searching for the digital advertisement. The basic settings display 202 can further include a flight date/time selection option 207. The flight date/time selection option 207 allows a user to select what date and time the user would like to deploy the digital advertisement. The flight date time selection option 207 can include an option for "same as line" and "custom". The "same as line" option can be the default option. The "same as line" option can be used if the user wishes the digital advertisement to inherit the same parameters as the line the digital advertisement has been assigned to. The lines can include placements associated with an ad campaign associated with the digital advertisement. The placements can include attributes such as screens, formats, and targeting. The lines can be assigned based on selecting/creating a campaign shell. Alternatively, the user can also select a "custom" option, to customize the date and time the user would like the digital advertisement to be deployed. The basic settings display 202 can further include an ad format selection 208. The ad format selection 208 can allow the user to select the format of the digital advertisement. The digital advertisement can be one or more of a display, video, rich media, social, or native. The basic settings display 202 can further include a screen type and environment selection 210 to allow the user to select one or types of screen types and environments on which the user wishes to deploy the digital advertisement. The screen type and environment selection 210 can include selections for screen types such as desktop, mobile, tablet, TV. The screen type and environment selection 210 can include sections for environment such as desktop web, mobile web, and in-app. The basic settings display 202 can further include a verification vendor selection 212. The verification vendor selection 212 can include a "same as line" selection and a "custom" selection. The "same as line" option can be used if the user wishes the digital advertisement to inherit the same parameters as the line the digital advertisement has been assigned to. Alternatively, the user can customize the verification vendor by selecting "custom". After making the necessary inputs, the user can select the "Save & Continue" button 214. In one embodiment, in response to selecting the "Save & Continue" button 214, the GUI can automatically launch the next screen. Alternatively, the user can click on the next screen to actuate the launch of the next screen. In response to selecting "Save & Continue" the Visto® application can transmit the input values to the computing system (e.g., computing system 150 as shown in FIG. 1) for storage.

Figure 2B:
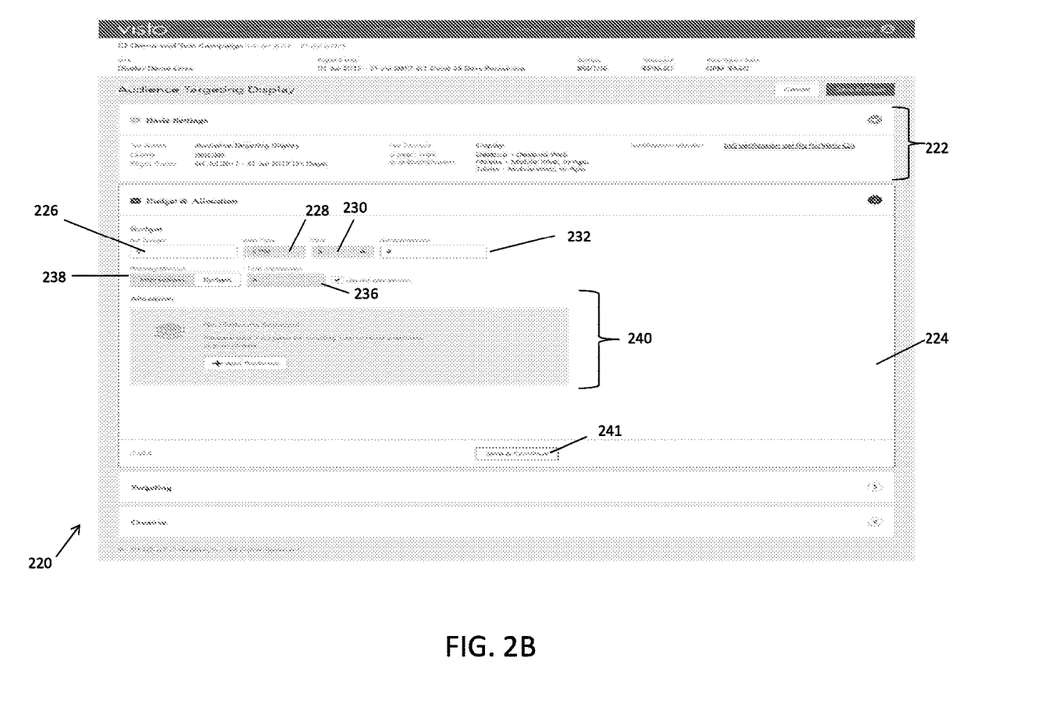

With reference to FIG. 2B, subsequent to selecting "Save & Continue" on the basic settings display (e.g., basic setting display 202 as shown in FIG. 2A), screen 220 can be launched. The screen 220 can include a basic settings summary 222 including a summary of the inputs and selections completed on the basic settings display. The screen 220 can further include a budget and allocation display 224. The budget and allocation display 224 can include an ad budget input box 226 to allow the user to enter a numerical value associated with a desired total budget. The budget and allocation display 224 can further include a rate type drop selection 228 to allow the user to select the rate type. As an example, the rate type can be "CPM" or clicks per minute. The budget and allocation display 224 can further include a rate input box 230 to allow the user to input a desired rate. The rate is the billable cost being charged to an advertiser. Continuing with the earlier example, if the desired rate is $4, the billable cost is $4 for a specified amount of clicks per minute. The budget and allocation display 224 can further include ad impressions input box 232 to allow the user to input the a numerical value associated with number of ad impressions desired. The budget and allocation display 224 can further include a booking method selection 238 to allow the user to select whether the digital advertisement should be deployed based on number of impressions or the budget. In the event the user selects impressions, the user can input a total number of impressions in the impression input box 236. In response to inputting a number of impressions of the digital advertisement a user desires to deliver, the Ad Budget input box 226 can be automatically populated with a total budget calculated based on the total number of impressions desired. Alternatively in response to a user inputting an Ad Budget value, the total impressions input box 236 can be automatically populated based on the total budget. The budget and allocation display 224 can further include an allocation selection 240 to allow users to select platforms to allocate the desired budget. The user can select the "Add Platforms" button to add platforms and select the allocation. After making the necessary inputs, the user can select the "Save & Continue" button 241. In response to selecting "Save & Continue" the Visto® application can transmit the input values to the computing system (e.g., computing system 150 as shown in FIG. 1) for storage.

Figure 2C:
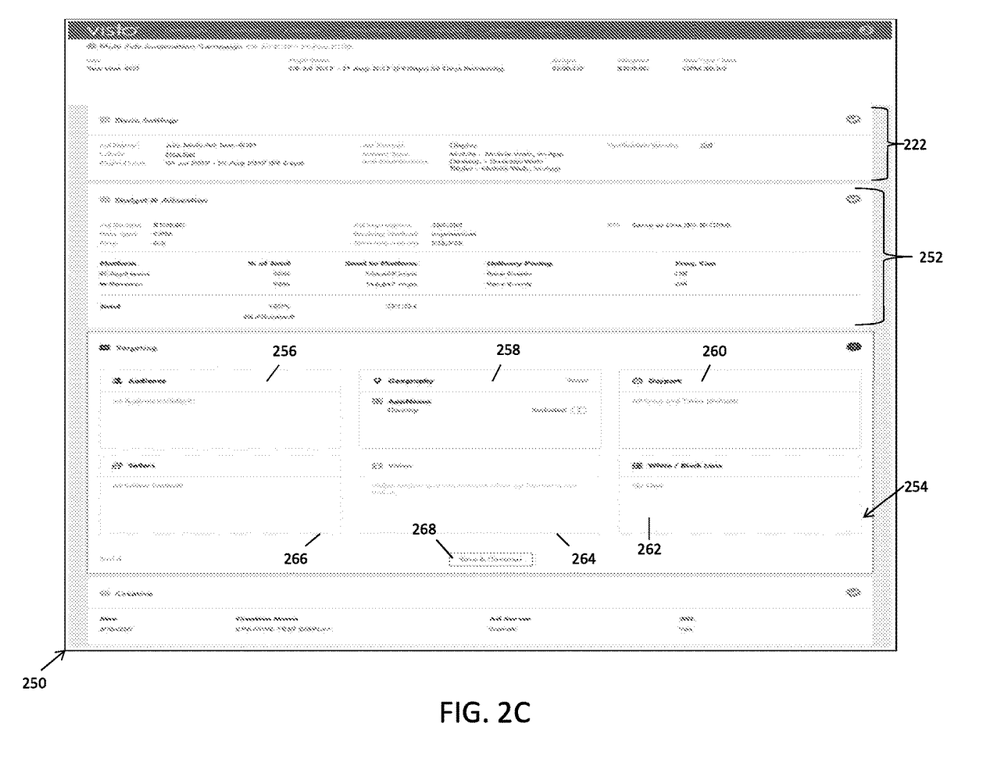

With reference to FIG. 2C, subsequent to selecting "Save & Continue" on the budget and allocation display (e.g., budget and allocation display 220 as shown in FIG. 2B), screen 250 can be launched. The screen 250 can include a basic settings summary 222 including a summary of the inputs and selections completed on the basic settings display. Additionally the screen 250 can include a budget and allocation summary 252 including a summary of the inputs and selections completed on the budget and allocation display. The screen 250 can further include a targeting display 254. The targeting display 254 can allow users to assign targeting parameters (as described with respect to FIG. 1) for the digital advertisement. The targeting display 254 can include targeting parameters such as, audience parameter selection 256, geography parameter selection 258, daypart parameter selection 260, white/blacklists parameter selection 262, video parameter selection 264, and sellers parameter selection 266. A user can specify the parameters for each selected platform. As an example, in the geography parameter selection 258, a user can select 1 country to include when deploying the digital advertisement on the AppNexus platform. After making the necessary inputs, the user can select the "Save & Continue" button 268. In response to selecting "Save & Continue" the Visto® application can transmit the input values to the computing system (e.g., computing system 150 as shown in FIG. 1) for storage.

Figure 2D:
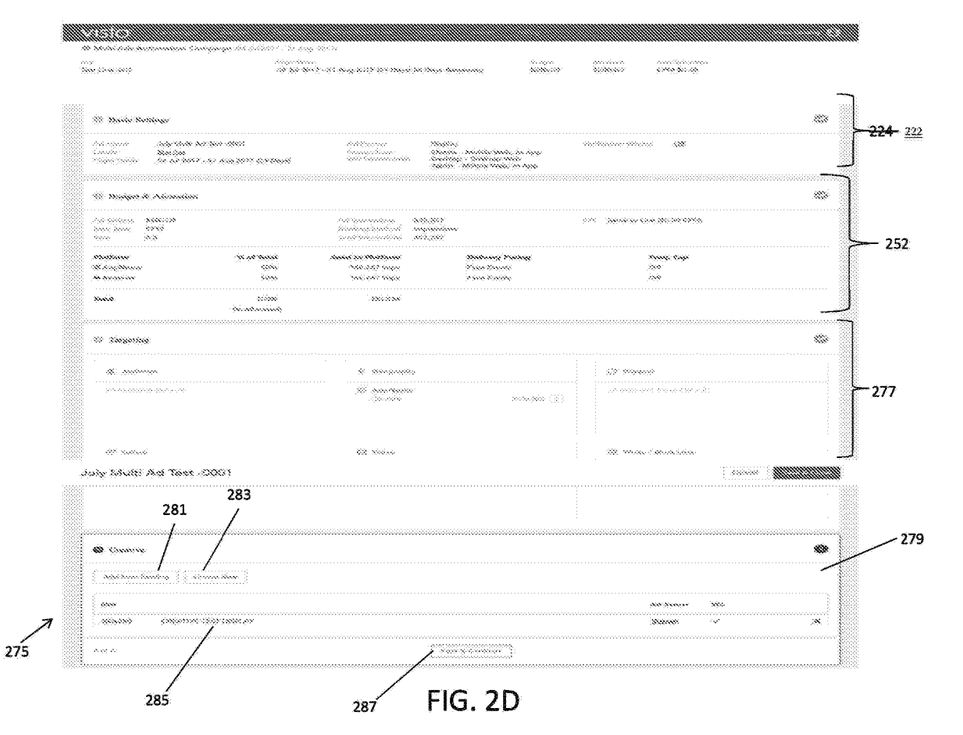

With reference to FIG. 2D, subsequent to selecting "Save & Continue" on the budget and allocation display (e.g., targeting display 254 as shown in FIG. 2C), screen 275 can be launched. The screen 275 can include a basic settings summary 222 including a summary of the inputs and selections completed on the basic settings display. Additionally the screen 250 can include a budget and allocation summary 252 including a summary of the inputs and selections completed on the budget and allocation display. Additionally the screen 250 can include a targeting summary 277 including a summary of the inputs and selections completed on the targeting display. The screen 275 can further include a creative display 279. The creative display 279 can allow users to upload or select creative assets (i.e., images, videos, rich text, etc) associated with the digital advertisement. The creative display 279 can include a "add from existing" selection 281 and a "create new" selection 283. In response to selecting the "add from existing" selection 281 a list of creative assets can be displayed for the user from a Creative Library. The creative assets that are relevant to the advertiser and/or brand associated with the user and the chosen Ad Format will be available for selection by the user. In response to selecting the "create new" selection 283, a user can create a new creative asset. The newly created creative asset can be added to the user's Creative Library, available for selection in the future. Information 285 associated with the selected/created creative asset can be displayed on the creative display 279. The name, size, ad server, and SSL support can be included in the information 285 in the creative asset. After making the necessary inputs, the user can select the "Save & Continue" button 287. In response to selecting "Save & Continue" the Visto® application can transmit the input values to the computing system (e.g., computing system 150 as shown in FIG. 1) for storage.

Figure 3:
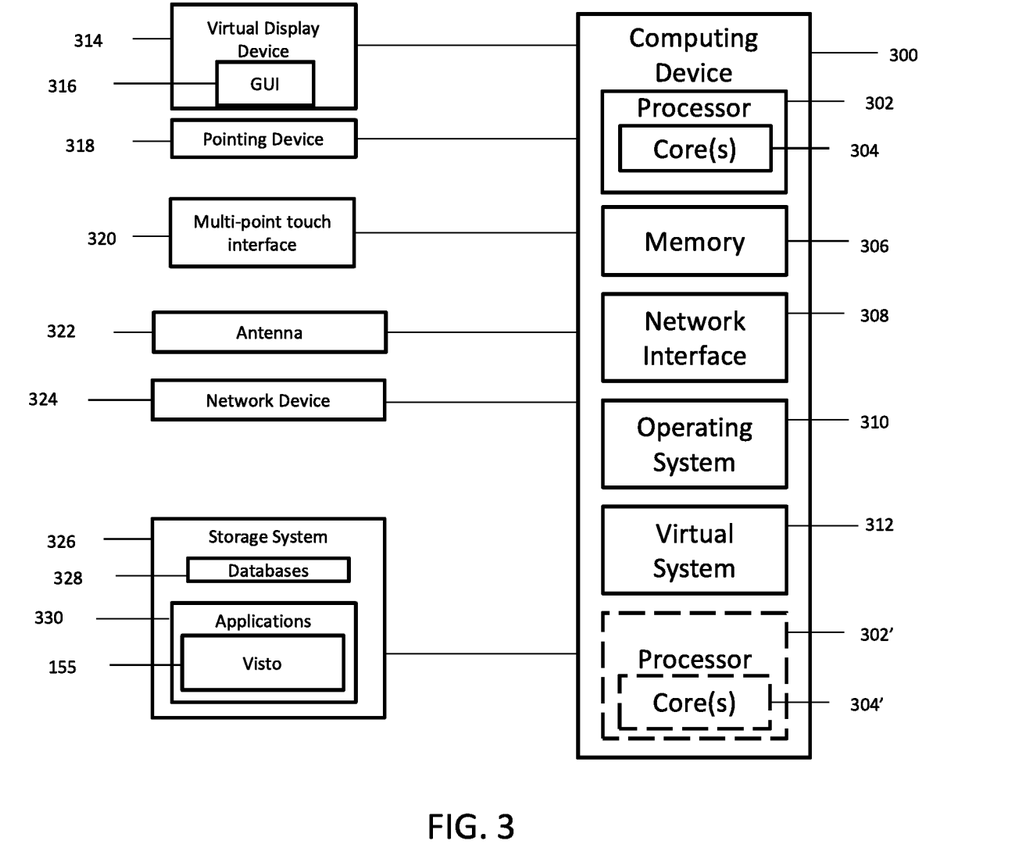
FIG. 3 illustrates a computing device in accordance with an exemplary embodiment.

FIG. 3 is a block diagram of an example computing device for implementing exemplary embodiments. The computing device 300 may be, but is not limited to, a smartphone, laptop, tablet, desktop computer, server or network appliance. The computing device 300 can be embodied as part of the computing system, user device, platforms (i.e., DSP, exchanges, SSP, publishers, APis), and the DMP. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the Visto® application 155 and management engine 121) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, and a pointing device 318.

The computing device 300 may also include one or more storage devices 326, such as a hard-drive, CD-ROM, or other computer readable media, for storing data and computer-readable instructions and/or software that implement exemplary embodiments (e.g., applications i.e. the Visto® application 155). For example, exemplary storage device 326 can include one or more databases 328 for storing information regarding, campaigns, platforms, audiences, and creative libraries. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
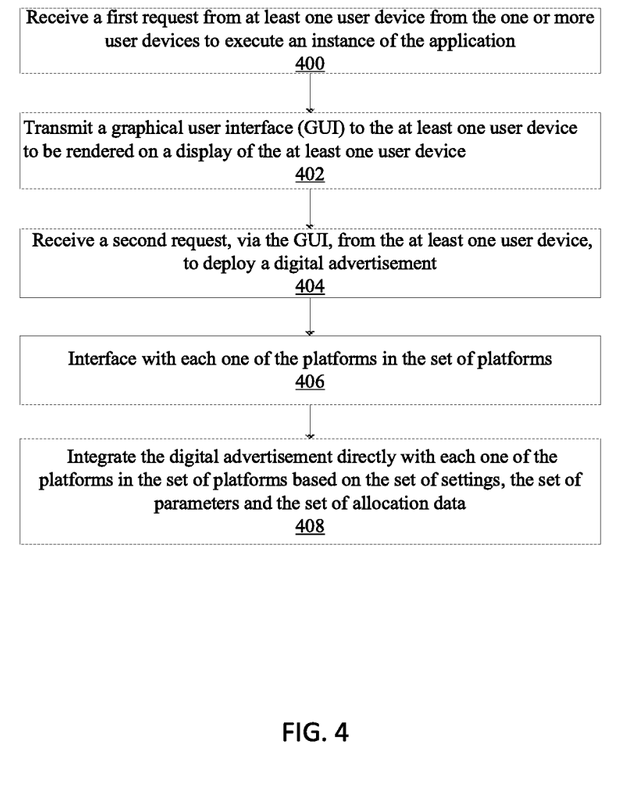
FIG. 4 is a flowchart illustrating an exemplary process performed the multi-platform integration system according to an exemplary embodiment.

FIG. 4 is a flowchart illustrating an exemplary process performed in the multi-platform integration system. In operation 400, a computing system (i.e., computing system 150 as shown in FIG. 1) hosting an application (i.e., Visto® application 155 as shown in FIG. 1) and in communication with, a plurality of platforms (i.e., the DSP 125a, exchange 125b, SSP 125c, publishers 125d, and API programs 125e as shown in FIG. 1), a database (i.e., databases 105 as shown in FIG. 1), and one or more user devices (i.e., user devices 130 as shown in FIG. 1) in a networked environment, can receive a first request from at least one user device from the one or more user devices to execute an instance of the application. In operation 402, the computing system can transmit a graphical user interface (GUI) (i.e., GUI 123 as shown in FIG. 1) to the at least one user device to be rendered on a display of the at least one user device. In operation 404, the computing system can receive a second request, via the GUI, from the at least one user device, to deploy a digital advertisement. The second request includes a set of platforms of the plurality of platforms, a set of settings, a set of parameters, and a set of allocation data. In operation 406, the computing system can interface with each one of the platforms in the set of platforms. In operation 408, the computing system can integrate the digital advertisement directly with each one of the platforms in the set of platforms based on the set of settings, the set of parameters and the set of allocation data.

Figure 5:
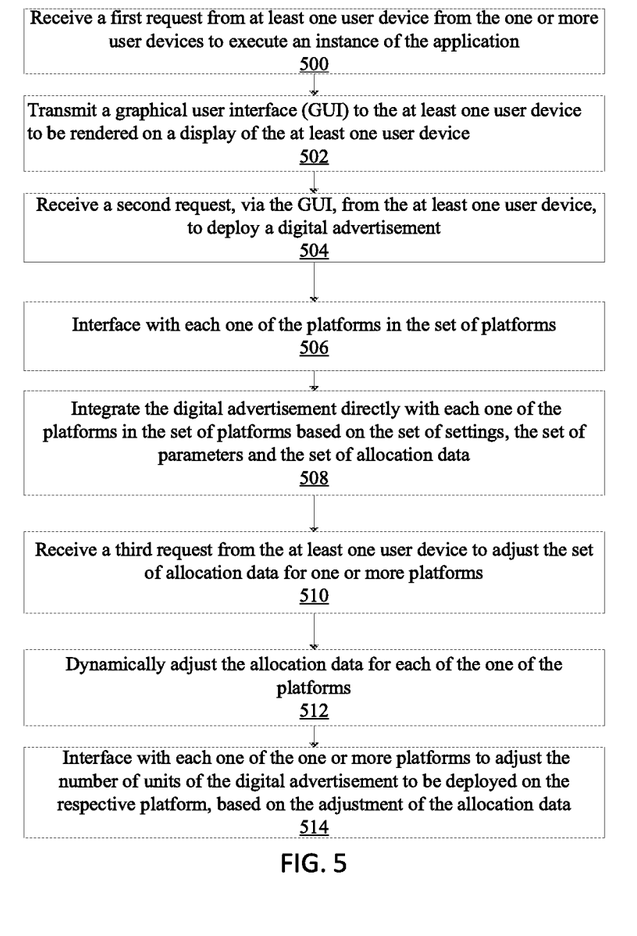
FIG. 5 is a flowchart illustrating an exemplary process performed the multi-platform integration system according to an exemplary embodiment.

FIG. 5 is a flowchart illustrating an exemplary process performed in a system for detecting unsecured sensors in a network. In operation 500, a computing system (i.e., computing system 150 as shown in FIG. 1) hosting an application (i.e., Visto® application 155 as shown in FIG. 1) and in communication with, a plurality of platforms (i.e., the DSP 125a, exchange 125b, SSP 125c, publishers 125d, and API programs 125e as shown in FIG. 1), a database (i.e., databases 105 as shown in FIG. 1), and one or more user devices (i.e., user devices 130 as shown in FIG. 1) in a networked environment, can receive a first request from at least one user device from the one or more user devices to execute an instance of the application. In operation 502, the computing system can transmit a graphical user interface (GUI) (i.e., GUI 123 as shown in FIG. 1) to the at least one user device to be rendered on a display of the at least one user device. In operation 504, the computing system can receive a second request, via the GUI, from the at least one user device, to deploy a digital advertisement. The second request includes a set of platforms of the plurality of platforms, a set of settings, a set of parameters, and a set of allocation data. In operation 506, the computing system can interface with each one of the platforms in the set of platforms. In operation 508, the computing system can integrate the digital advertisement directly with each one of the platforms in the set of platforms based on the set of settings, the set of parameters and the set of allocation data. The allocation data is associated with a number of units of the digital advertisement to be deployed to each platform in the set of platforms. In operation 510 the computing system can receive a third request from the at least one user device to adjust the set of allocation data for one or more platforms of the set of platforms on which the digital advertisement has been integrated, after the digital advertisement is integrated with each one of the platforms of the set of platforms. In operation 512, the computing system can dynamically adjust the allocation data for each of the one of the platforms. In operation 514, the computing system can interface with each one of the one or more platforms to adjust the number of units of the digital advertisement to be deployed on the respective platform, based on the adjustment of the allocation data.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A multi-platform integration system, the system comprising:
 a computing system in communication with, a plurality of platforms including a plurality of publishers, exchanges, DSPs, and SSPs, a database, and one or more user devices in a networked environment, the computing system hosting an application, the computing system configured to:
 receive a first request from a first user device from the one or more user devices to execute an instance of the application creating a campaign shell for each of a plurality of campaigns, each request including a line in the campaign shell;
 transmit a graphical user interface (GUI) to the first user device to be rendered on a display of the first user device;
 receive a second request, via the GUI, from the first user device, to deploy a digital advertisement, the second request including digital data, a set of platforms of the plurality of platforms, a set of settings, a set of parameters, and allocation data, the second request including a configuration of a line associated with the campaign shell for a corresponding campaign, the line corresponding to a customized placement of a digital advertisement configured based on a screen type of the first user device;
 deploy the digital advertisement directly with each one of the platforms in the set of platforms based on the set of settings, the set of parameters, and the allocation data;
 in response to deploying the digital advertisement, render delivery and performance information associated with the digital advertisement for each platform, and receive user input associated with adjustments in the budget and allocation information while the digital advertisement is deployed;
 calculate and render an ad budget value for the liner associated with the campaign shell, the ad budget value being dynamically adjusted across the plurality of platforms for each of the plurality of campaigns; and
 receive a subsequent selection of push campaign, after adjusting the ad budget value, dynamically reallocate the ad budget value among each of the platforms based on the adjustments and distribute the reallocations across the plurality of platforms.

2. The system of claim 1, wherein the digital data of the digital advertisement is one or more of an image, video, text, or audio.

3. The system of claim 1, wherein the allocation data is associated with a number of units of the digital advertisement to be deployed to each platform in the set of platforms.

4. The system of claim 3, wherein the computing system is further configured to:
 receive a third plurality of requests from the first user device to adjust the allocation data for one or more platforms of the set of platforms on which the digital advertisement has been integrated, after the digital advertisement is integrated with each one of the platforms of the set of platforms;
 dynamically adjust the allocation data for each of the one of the platforms; and
 interface with each one of the one or more platforms to adjust the number of units of the digital advertisement to be deployed on the respective platform, based on the adjustment of the allocation data.

5. The system of claim 3, wherein the computing system is further configured to:
 receive performance data associated with the digital advertisement; and
 render the performance data on the GUI.

6. The system of claim 1, wherein the set of platforms includes one or more of: a demand side platform (DSP), a supply side platform (SSP), an ad exchange, a publisher, and an Application Program Interface (API) program.

7. The system of claim 6, wherein a publisher is associated with a web-site.

8. The system of claim 7, wherein in response to integrating the digital advertisement with a publisher, the computing system is configured to embed the digital advertisement on the web-site at a specified location.

9. The system of claim 1, wherein the set of settings include one or more of: flight dates, ad format, screen types, and Key Performance Indicators.

10. The system of claim 1, wherein the set of parameters include one or more of: audience, geography, daypart, sellers, video, and white/blacklists.

11. A method for multi-platform integration, the method comprising:
receive, via a computing system in communication with, a plurality of platforms, a database, and one or more user devices in a networked environment, the computing system hosting an application, a first request from a first user device from the one or more user devices to execute an instance of the application creating a campaign shell for each of a plurality of campaigns, each request including a line in the campaign shell;
transmit, via the computing system, a graphical user interface (GUI) to the first user device to be rendered on a display of the first user device;
receive, via the computing system, a second request, via the GUI, from the first user device, to deploy a digital advertisement, the second request including digital data, a set of platforms of the plurality of platforms, a set of settings, a set of parameters, and allocation data, the second request including a configuration of a line associated with the campaign shell for a corresponding campaign, the line corresponding to a customized placement of a digital advertisement configured based on a screen type of the first user device;
interface, via the computing system, with each one of the platforms in the set of platform;
deploy, via the computing system, the digital advertisement directly with each one of the platforms in the set of platforms based on the set of settings, the set of parameters, and the allocation data;
in response to deploying the digital advertisement, render delivery and performance information associated with the digital advertisement for each platform;
receive input associated with adjustments in the budget and allocation information while the digital advertisement is deployed;
calculate and render an ad budget value for the line associated with the campaign shell, the ad budget value being dynamically adjusted across the plurality of platforms for each of the plurality of campaigns; and
receive a subsequent selection of push campaign, after adjusting the ad budget value, dynamically reallocate the ad budget value among each of the platforms based on the adjustments and distribute the reallocations across the plurality of platforms.

12. The method of claim 11, wherein digital data of the digital advertisement is one or more of an image, video, text, or audio.

13. The method of claim 11, wherein the allocation data is associated with a number of units of the digital advertisement to be deployed to each platform in the set of platforms.

14. The method of claim 13, further comprising:
receiving, via the computing system, a third request from the first user device to adjust the allocation data for one or more platforms of the set of platforms on which the digital advertisement has been integrated, after the digital advertisement is integrated with each one of the platforms of the set of platforms; and
dynamically adjusting, via the computing system, the allocation data for each of the one of the platforms; and
interfacing, via the computing system, with each one of the one or more platforms to adjust the number of units of the digital advertisement to be deployed for the respective platform, based on the adjustment of the allocation data.

15. The method of claim 13, further comprising:
receiving, via the computing system, performance data associated with the digital advertisement; and
rendering, via the computing system, the performance data on the GUI.

16. The method of claim 11, wherein the set of platforms includes one or more of: a demand side platform (DSP), a supply side platform (SSP), an exchange, a publisher, and an Application Program Interface (API) program.

17. The method of claim 16, further comprising embedding, via the computing system, the digital advertisement on a web-domain associated with a publisher, on a specified location of the web-domain, in response to integrating the digital advertisement with the publisher.

18. The method of claim 11, wherein the set of settings include one or more of: flight dates, ad format, screen types, and Key Performance Indicators.

19. The method of claim 11, wherein the set of parameters include one or more of: audience, geography, daypart, sellers, video, and white/blacklists.

20. A non-transitory computer readable medium for integrating digital data on multiple platforms, wherein instructions are executable by a processor to:
receive, via a computing system in communication with, a plurality of platforms, a database, and one or more user devices in a networked environment, the computing system hosting an application, a first request from a first user device from the one or more user devices to execute an instance of the application creating a campaign shell for each of a plurality of campaigns, each request including a line in the campaign shell;
transmit, via the computing system, a graphical user interface (GUI) to the first user device to be rendered on a display of the first user device;
receive, via the computing system, a second request, via the GUI, from the first user device, to deploy a digital advertisement, the second request including digital data, a set of platforms of the plurality of platforms, a set of settings, a set of parameters, and allocation data, the second request including a configuration of a line associated with the campaign shell for a corresponding campaign, the line corresponding to a customized placement of a digital advertisement configured based on a screen type of the first user device;
interface, via the computing system, with each one of the platforms in the set of platform;
deploy, via the computing system, the digital advertisement directly with each one of the platforms in the set of platforms based on the set of settings, the set of parameters, and the allocation data;
in response to deploying the digital advertisement, render delivery and performance information associated with the digital advertisement for each platform;
receive input associated with adjustments in the budget and allocation information while the digital advertisement is deployed;
calculate and render an ad budget value for the line associated with the campaign shell, the ad budget value being dynamically adjusted across the plurality of platforms for each of the plurality of campaigns; and receive a subsequent selection of push campaign, after adjusting the ad budget value, dynamically reallocate the ad budget value among each of the platforms based on the adjustments and distribute the reallocations across the plurality of platforms.

* * * * *

UNITED STATES PATENT AND TRADEMARK OFFICE
CERTIFICATE OF CORRECTION

| | |
|---|---|
| PATENT NO. | : 11,481,817 B2 |
| APPLICATION NO. | : 16/040690 |
| DATED | : October 25, 2022 |
| INVENTOR(S) | : Muthegere et al. |

It is certified that error appears in the above-identified patent and that said Letters Patent is hereby corrected as shown below:

In the Specification

In Column 4, Line 28, delete "Visto" and insert --Visto®-- therefor

In Column 5, Line 3, delete "125B," and insert --125C,-- therefor

In Column 5, Line 3, delete "125C," and insert --125B,-- therefor

In Column 8, Line 29, delete "125$b$" and insert --125$c$-- therefor

In Column 8, Line 42, delete "Visto" and insert --Visto®-- therefor

In Column 10, Line 9, delete "220" and insert --224-- therefor

Signed and Sealed this
Nineteenth Day of September, 2023

Katherine Kelly Vidal
*Director of the United States Patent and Trademark Office*